UNITED STATES PATENT OFFICE.

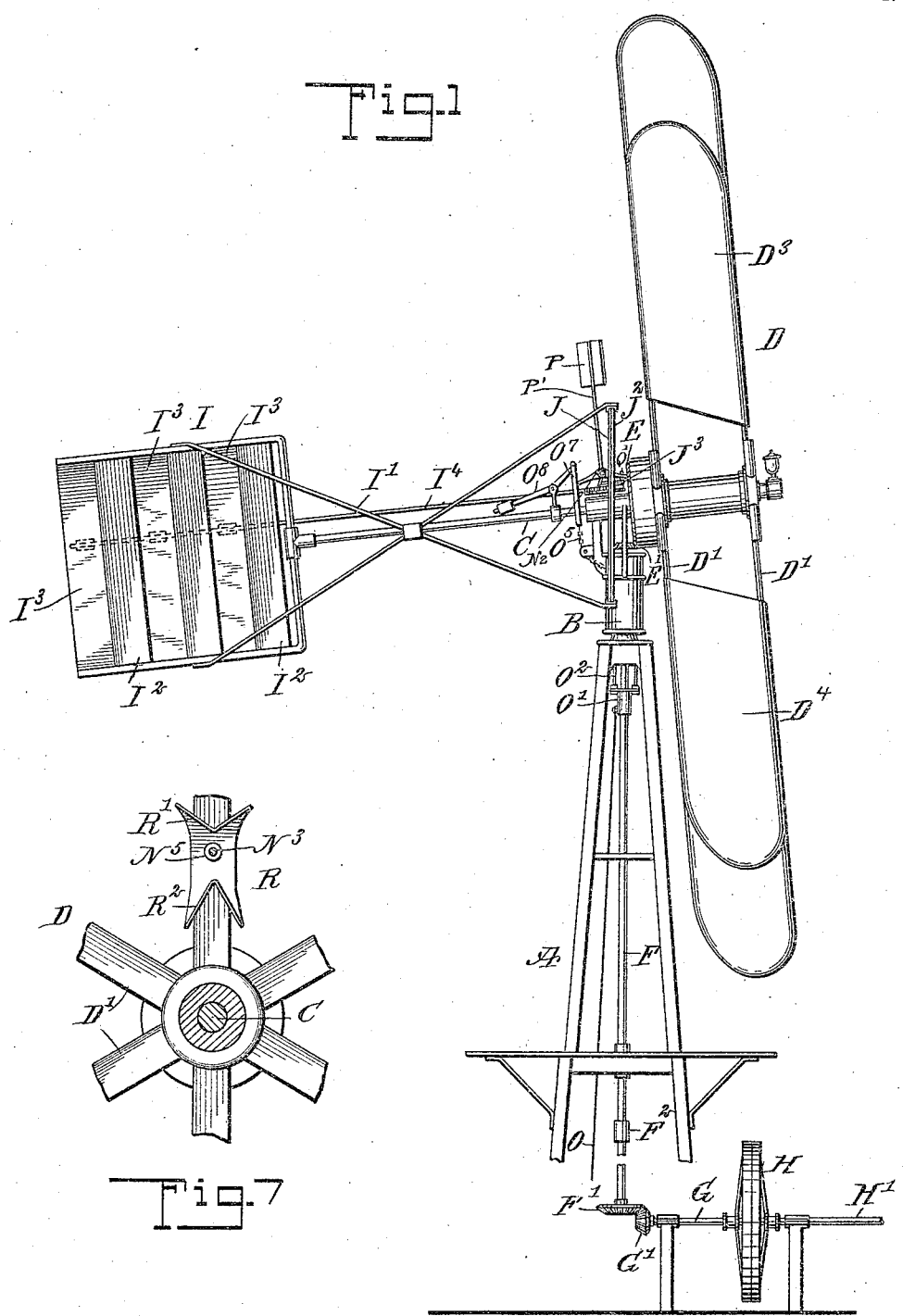

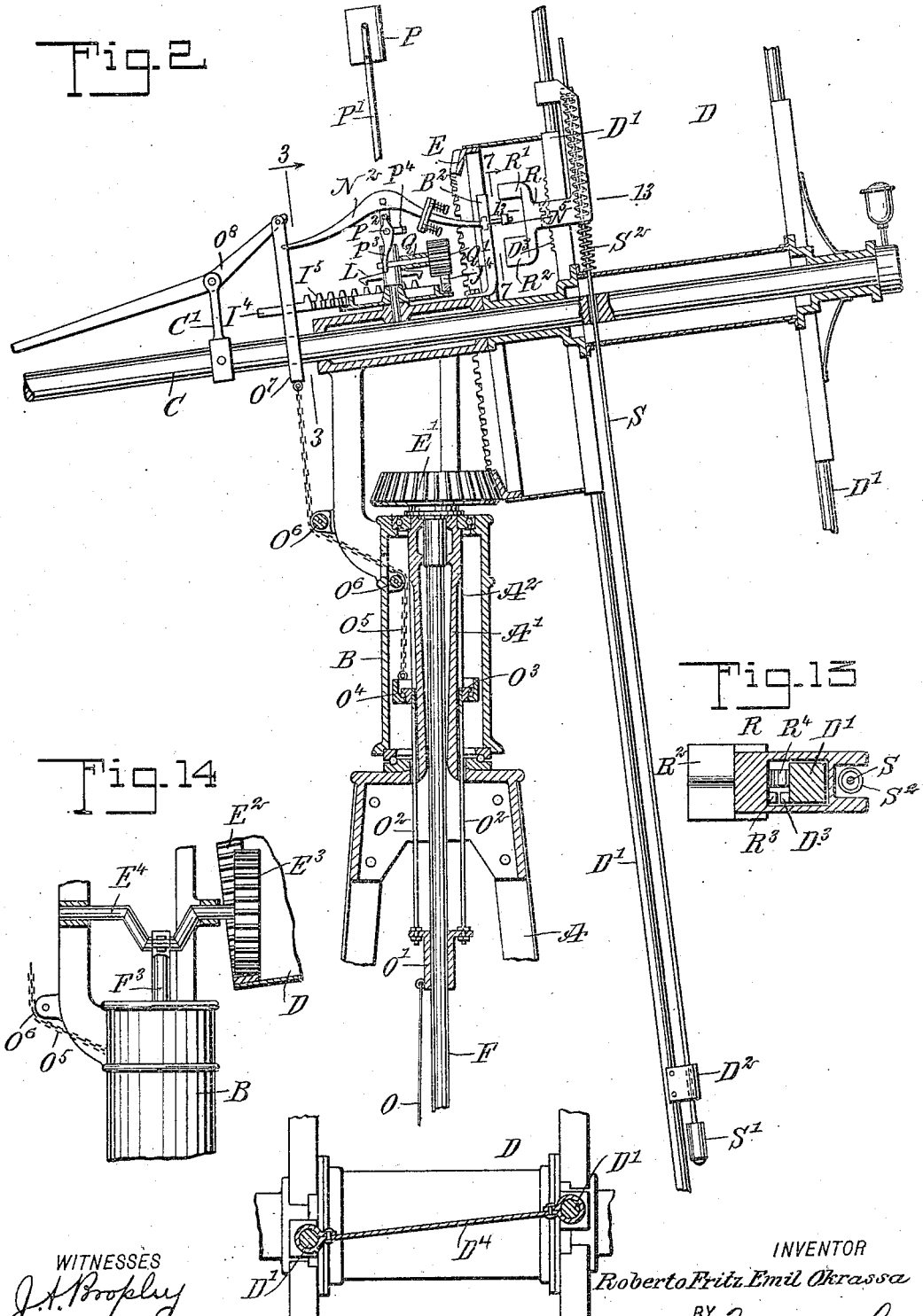

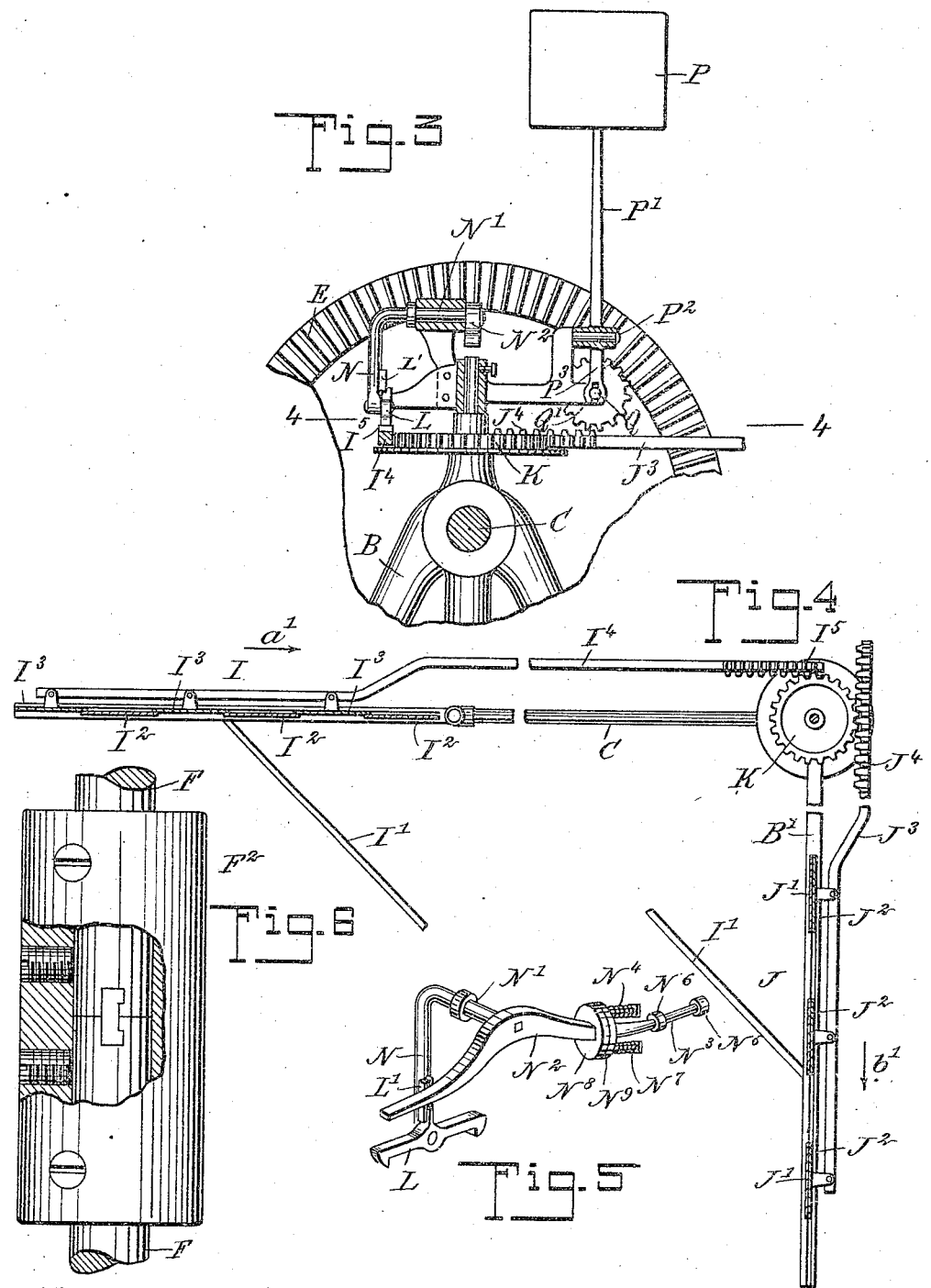

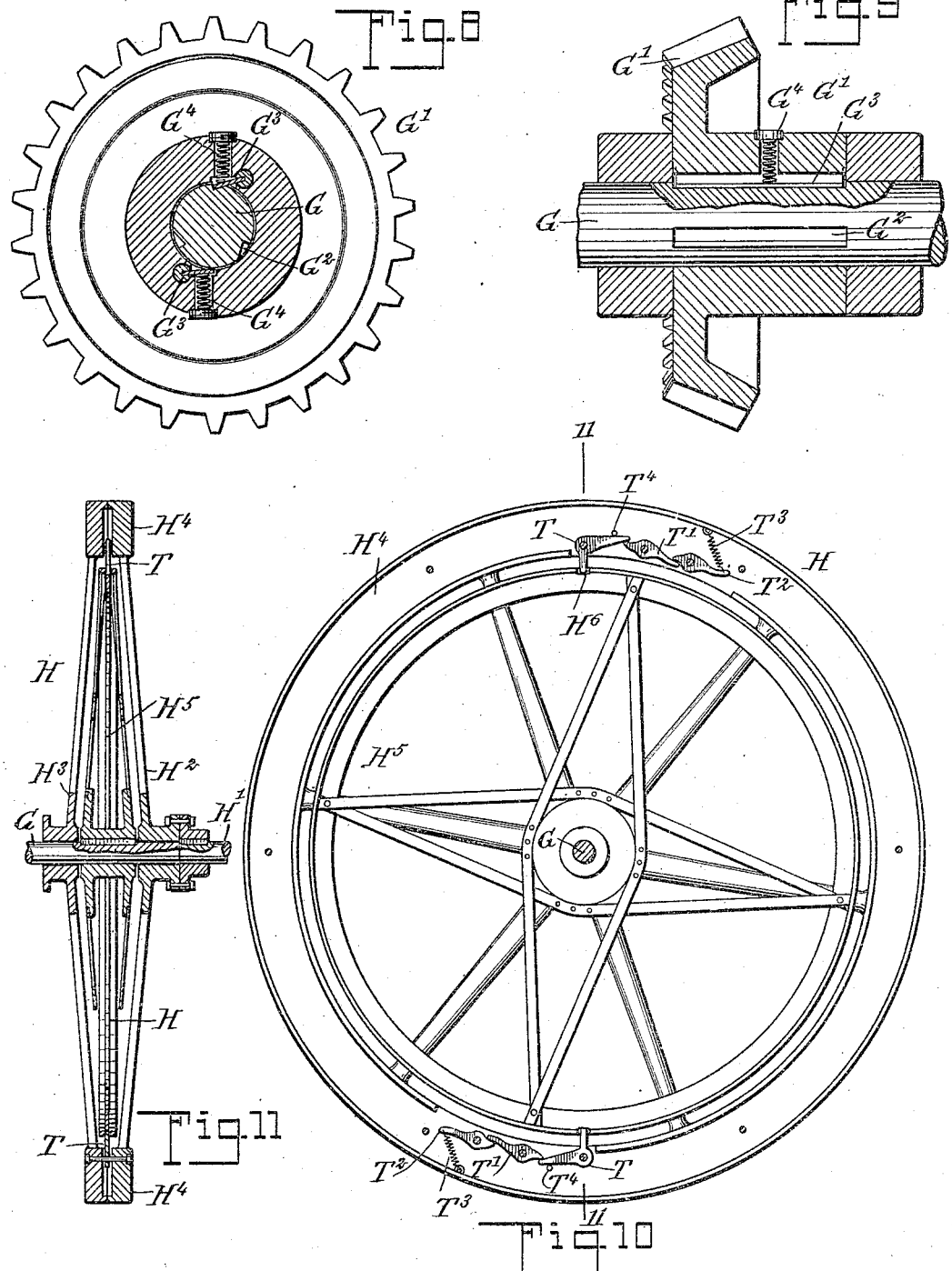

ROBERTO FRITZ EMIL OKRASSA, OF ANTIGUA, GUATEMALA.

WIND-MOTOR.

944,148.

Specification of Letters Patent. Patented Dec. 21, 1909.

Application filed September 17, 1907. Serial No. 393,303.

*To all whom it may concern:*

Be it known that I, ROBERTO FRITZ EMIL OKRASSA, a subject of the German Emperor and King of Prussia, and a resident of Antigua, Guatemala, Central America, have invented a new and Improved Wind-Motor, of which the following is a full, clear, and exact description.

The object of the invention is to provide a new and improved wind motor, arranged to utilize the power of the wind to the fullest advantage, to hold the wind wheel accurately in the wind, to protect the wind wheel in case of storms and to properly transmit the power of the motor to other machinery.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is an enlarged sectional side elevation of the same; Fig. 3 is an enlarged transverse section of the same on the line 3—3 of Fig. 2; Fig. 4 is a reduced sectional plan view of the same on the line 4—4 of Fig. 3, and showing more particularly the angularly disposed vanes having movable shutters; Fig. 5 is a perspective view of the actuating lever for the vanes; Fig. 6 is an enlarged side elevation, partly in section, of the tower shaft coupling; Fig. 7 is an enlarged cross section of the improvement on the line 7—7 of Fig. 2, and showing more particularly the regulating cam on the wind mill for controlling the number of revolutions of the wind wheel; Fig. 8 is an enlarged cross section of the connecting wheel coupling; Fig. 9 is a longitudinal sectional elevation of the same; Fig. 10 is an enlarged face view of the fly wheel; Fig. 11 is a transverse section of the same on the line 11—11 of Fig. 10; Fig. 12 is a sectional plan view of the wind wheel; Fig. 13 is an enlarged sectional plan view of the regulating cam on the wind wheel, the section being on the line 13—13 of Fig. 2, and Fig. 14 is a sectional side elevation of a modified form of the gearing for connecting the wind wheel with the tower shaft.

On the upper end of the tower A is mounted to turn the head B carrying a fixed shaft or rod C on which the wind wheel D is mounted to rotate. The wind wheel D is provided at its rear face with a bevel gear wheel E in mesh with a pinion E' secured on the upper end of the tower shaft F, journaled in suitable bearings arranged on the tower A, and connected at its lower end by a bevel gear wheel F' with a bevel pinion G' held on the transmission shaft G journaled in bearings arranged on the ground. A fly wheel H of special construction couples the shaft G with the driven shaft H' employed for transmitting the power of the wind wheel D to other machinery. The fly wheel H is arranged to disconnect the shafts G and H' whenever an excess of power exists in the wind wheel D, to allow the latter to run free or loose relatively to the shaft H' so that the latter can come to a standstill, as hereinafter more fully explained.

The wind wheel D can be moved into or out of the wind; first, from a device manually controlled from the ground; second, by a device controlled by wind of ordinary velocity; third, by a device rendered active in the case of a storm; and fourth, by a device actuated by the wind wheel D, in case the latter revolves in excess of a normal rate of speed. For the purpose mentioned the following arrangement is made: Two vanes I and J are supported from the head B, the said vanes I and J being arranged at angles one to the other, the vane I extending longitudinally parallel to the axis of the wind wheel D and the vane J extending transversely to the axis of the wind wheel D, the vanes being rendered rigid in their relations one to the other and the head B by a diagonal brace I' (see Figs. 1 and 4). The vane I as shown in the drawings, is mounted on the rear extension of the shaft or rod C, while the vane J is mounted on a support B' attached to the head B. The vanes I and J are provided with spaced slats $I^2$, $J'$ and shutters $I^3$, $J^2$, slidable on the vanes, for covering and uncovering the spaces between the corresponding slats $I^2$, $J'$, and shutters $I^3$, $J^2$, to increase or decrease the resistance the vanes offer to the wind (see Fig. 4). The shutters $I^3$, $J^2$ are secured on slidable rack bars $I^4$, $J^3$ in mesh with a horizontally disposed gear wheel K mounted to turn loosely on the top of the head B. Now when a sliding movement is given, say to the rack bar I⁴, in the direction of the arrow $a'$ (see Fig. 4), to move the shutter I³ from a closed into an open position, then the gear wheel K is turned by the rack bar I⁴ and the rotary motion of the gear wheel K is transmitted to the rack bar J³, to move the latter in the direction of the arrow $b'$, thus moving the shutter J² into a closed position, and when the rack bar I⁴ is moved in a reverse direction then the shutter I³ moves into a closed position, while the shutter J² moves into an open position. A like action takes place in case the other rack bar J³ is moved, that is, one shutter moves into an open position while the other shutter moves into a closed position. It is understood that when a shutter is in a closed position on its vane then the resisting area to the wind of this shutter is increased, and when the shutter is opened the resisting area of this vane is decreased.

The rack bar I⁴ is provided at the top with teeth I⁵ adapted to be engaged by a double pawl L fulcrumed on the depending arm N of the shaft N′ of a rocking lever N², the said shaft N′ being journaled in bearings arranged on the head B, and the said double pawl L being held normally in an inactive position relative to the teeth I⁵ by a spring L′, as plainly indicated in Fig. 5. Now when the lever N² is rocked the double pawl L is moved in mesh with the teeth I⁵ and moves the rack bar I⁴ either forward or backward, according to the direction in which the lever N² is rocked.

When it is desired by the operator to move the wind wheel D out of the wind then the shutter J² on the vane J is moved into a closed position, while the shutter I³ on the vane I is fully opened, so that the pressure of the wind on the vane J moves the latter around, thus giving, approximately, a quarter turn to the head B, whereby the wind wheel D is turned out of the wind. For the purpose mentioned the following manually actuated device is provided: A rope O reaching to the ground connects at its upper end with a collar O′ mounted to slide loosely on the shaft F (see Fig. 2), and this collar O′ is connected by rods O² with a collar O³, mounted to slide up and down on the upper end A′ of the tower A, but is held against turning on the said upper end A′ by the rods O² extending into vertically disposed slots A² formed on the said upper end A′. The collar O³ is engaged by a ring O⁴ mounted to turn on the collar O³ and moving with the same when the collar O³ moves downward, the said ring O⁴ being connected with one end of a chain O⁵ extending upward and passing over guide pulleys O⁶ journaled on the head B. The upper end of the chain O⁵ is connected with a link O⁷ pivotally connected with the forward end of a weighted lever O⁸ fulcrumed on a bracket C′ attached to the rod or shaft C. The forward end of the weighted lever O⁸ is adapted to engage the left-hand end of the lever N², so that when the operator pulls on the rope O then a downward swinging motion is given to the forward end of the lever O⁸ by the mechanism just described, so that this forward end of the lever O⁸ comes in contact with the lever N² at the left hand side thereof, thereby swinging this end of the lever N² downward and causing the double pawl L to engage the teeth I⁵ and to shift the bar I⁴ in the direction of the arrow $a'$. When this takes place the shutter I³ moves toward its open position, and as the rack bar I⁴ turns the gear wheel K and the latter imparts a sliding motion to the rack bar J³, it is evident that the shutter J² moves toward its closed position, to allow the wind to turn the vane J, so as to swing the wind wheel D out of the wind. The operator on releasing the rope O allows the weighted lever O⁸, the lever N and the pawl L to return and when another pull is given by the operator to the rope O, then the above described operation is repeated; that is, the shutter I³ moves farther toward its open position, while the shutter J² is moved farther toward its closed position. Thus, by the operator alternately pulling and releasing the rope O, the shutter I³ may be moved into a full open position, while the shutter J² moves into a full closed position. In order to hold the wind wheel D out of the wind for any desired length of time after the cord O is pulled downwardly, the operator fastens the lower end of the cord O to a cleat or other device.

When it is desired by the operator to move the shutters I³ and J² into reverse positions then the operator pulls the cord O farther down so that the end of the weighted lever O⁸ passes the left-hand end of the lever N², at about the time the rack bar I⁴ has been shifted the maximum distance for opening the shutter I³ and closing the shutter J², and by alternately pulling and releasing the rope O, the lever N² is turned in the reverse direction and the double pawl L gradually returns the rack bar I⁴ to its former position, whereby the shutter I³ is again closed while the shutter J² is opened, and the wind now acting on the closed vane I causes a return of the wind wheel into the wind. By having the vanes I and J standing approximately at right angles to each other and providing the said vanes with shutters as described, it is evident that the wind acting on either of the vanes having the closed shutters, tends to move the wind wheel D in or out of the wind.

In order to turn the wind wheel out of the wind in case of a storm, the following arrangement is made: A storm vane P set slightly at an angle to the face of the wind wheel D is secured on the upper end of a lever P′ fulcrumed at P² on the head B, to allow the lever P′ to swing in a longitudinal direction when a storm acts on the vane P. The lever P′ has a forked extension P³ engaging the rear end of a longitudinal shaft Q mounted to turn and to slide lengthwise in a bearing on the head B, the forward end of the said shaft Q carrying a pinion Q′ at all times in mesh with gear teeth J⁴ arranged on the top of the rack bar J³ (see Fig. 3). The pinion Q′ is normally out of mesh with the gear wheel E (see Fig. 2), but when the storm vane P is forced rearward by storm pressure then the lever P′ shifts the shaft Q forwardly, so that the pinion Q′ moves in mesh with the inner ends of the teeth of the gear wheel E rotating with the wind wheel D, whereby the pinion Q′ is rotated. Now as the pinion Q′ is at all times in mesh with the teeth J⁴ of the rack bar J³, the latter is shifted in the direction of the arrow b′, whereby the shutter J² is closed and the shutter I³ is opened, to cause the wind pressure exerted on the vane J to turn the wind wheel D out of the wind. The lever P′ is provided with a weighted arm P⁴ to give the desired resistance to the storm vane P, to return the latter to normal vertical position as soon as the pressure on the vane P decreases correspondingly. Now when the vane P and the lever P′ return, the shaft Q and pinion Q′ are returned by the action of the forked end P² of the lever P on the shaft Q, so that the pinion Q′ is moved out of mesh with the gear wheel E.

In order to turn the wind wheel out of the wind in case the wind wheel exceeds a predetermined or normal speed, a regulator is provided, arranged as follows: An extension arm N³ is yieldingly mounted on the right hand end of the lever N² and the said extension arm N³ is normally held in position by springs N⁴, as indicated in Fig. 5. On the free end of the extension arm N³ of the lever N² is mounted a friction roller N⁵ adapted to be engaged by V-shaped cam faces R′, R² of a cam R mounted to slide on one of the rear spokes D′ of the wind wheel D. The cam R is engaged by a rod S mounted to slide in bearings D² on the wind wheel, and carrying at its outer end a weight S′ (see Fig. 2), forced outward by centrifugal force when the wind wheel D is rotating. A spring S² is coiled on the rod S and presses with one end on the cam R and rests with its other end on the hub of the wind wheel D, so that the cam R is held in the position shown in Fig. 2 at the time the wind wheel D is rotating at a normal rate of speed. The cam R (see Fig. 13) is provided with a tooth R³ adapted to engage one of a series of teeth D³ formed on the spoke D′ on which the cam R is mounted to slide, the teeth R³ being normally held out of engagement with the rack teeth D³ by a spring R⁴ interposed between the cam R and the spoke D′. Now when the wind wheel D exceeds its normal rate of speed, the weight S′ in moving outward pulls the cam R inward against the tension of the spring S², so that the cam surface R′ engages the friction roller N⁵, thus imparting a swinging motion to the lever N², whereby the double pawl L is moved in engagement with the teeth I⁵ on the rack bar I⁴, to shift the latter in the inverse direction of the arrow a′. Thus the shutters I³ and J² of the vanes I and J are shifted, to cause the wind wheel to be turned out of the wind, as previously explained. It is understood that when the cam surface R′ strikes the friction roller N⁵, then the resistance offered by the friction roller N⁵ shifts the cam R forwardly sufficient to overcome the resistance of the spring R⁴, so that the tooth R³ moves in engagement with the rack teeth D³, to cause the cam R to be locked in place on the spoke D′ for the time being. When the motion of the wind wheel D, turned out of the wind, decreases below that of a normal rate of speed, then the spring S² causes the cam R to slide outward, whereby the friction roller N⁵ is engaged by the cam surface R², and the lever N² is swung in the reverse direction, to cause a reversing of the shutters I³ and J², whereby the wind wheel is turned back into the wind, as previously explained. It is understood that when the cam surface R′ or R² is in an active position, each revolution of the wind wheel D causes the corresponding cam surface R′ or R² to act successively on the lever N² until the shutters I³ and J² are moved into a full closed and open position respectively; it being understood that on each rocking motion of the lever N², the double pawl L shifts the rack bar I⁴ the distance between two teeth I⁵. Thus by the arrangement described, the wind wheel is turned out of the wind when rotating at an excess rate of speed, and is turned back into the wind as soon as the speed of the wind wheel falls below a normal rate of speed.

The extension arm N³ of the lever N² is provided with a friction roller N⁶ operating in a vertically disposed bearing B² arranged on the head B, so as to guide the lever N² in its up and down swinging movement. The springs N⁴ previously mentioned are preferably held on rods N⁷ secured to a flange N⁸ on the lever N², and against which flange abuts a flange N⁹ held on the extension arm N³. Thus by the arrangement described the extension arm N³ is free to yield in case two of the devices for throwing the wind wheel out of the wind are actuated at the same time, that is, for instance, the operator pulls on the rope O at the time the regulator R is actuated, as above explained, so that no breakage can occur. The tower shaft F is preferably made in sections connected with each other by couplings F², as plainly indicated in Figs. 1 and 6.

The bevel gear wheel G′ previously mentioned is mounted to rotate loosely on the shaft G, but is capable of turning the same in one direction by the use of pawls G³ (see Figs. 8 and 9), fulcrumed in the hub of the bevel gear wheel G′ and engaging notches G² formed lengthwise in the shaft G. Springs G⁴ held in the hub of the gear wheel G′ press the pawls G³ inward, to hold the same in engagement with the notches G². Now when the gear wheel G′ is turned from the gear wheel F′, a rotary motion is transmitted to the shaft G by the pawls G³, but in case the speed of the shaft G exceeds that of the shaft F, then the shaft G is free to revolve in the hub of the gear wheel G′, that is, is free to run ahead of the gear wheel G′.

The fly wheel H coupling the shafts G and H′ with each other is provided with spiders H², H³, mounted to rotate loosely on the shaft G, but having the outer spider H² rigidly secured to the shaft H′ (see Fig. 11). The spiders H², H³ are rigidly connected at their outer ends with the rim H⁴ of the fly wheel, and between the said spiders H², H³ and the rim H⁴ is arranged a lighter wheel H⁵ secured on the shaft G. The rim of the wheel H⁵ is provided with notches H⁶ (see Figs. 10 and 11), each engaged by one arm of a bell crank lever T, fulcrumed on the rim H⁴, and engaged at its other arm by a lever T′ likewise fulcrumed on the rim H⁴ and engaged by a lever T² also fulcrumed on the rim H⁴. A spring T³ presses the lever T² so as to normally hold the lever T in engagement with the corresponding notch H⁶, whereby the rotation of the shaft G is transmitted by the wheel H⁵ and lever T to the rim H⁴, which by the spider H² rotates the shaft H′. A stop pin T⁴ on the rim H⁴ limits the outward swinging motion of the lever T.

The spring and lever connection between the rim H⁴ and the wheel H⁵ is such that it connects the wheel H⁵ with the rim H⁴, as long as the wind wheel D runs at normal speed, but in case this speed is exceeded then the increased resistance of the rim H⁴ relative to the lighter wheel H⁵ causes the lever T to become disconnected from the lighter wheel H⁵, and consequently the shafts G and H′ are disconnected from each other. The wind wheel D being free of the load now rotates at a high rate of speed, so that it is thrown out of the wind by the action of the vanes I and J owing to the action of the regulating device above referred to.

The operation is as follows: When the wind wheel D is running at a normal rate of speed, the several parts are in the position illustrated in the drawings, that is, the shutters I³ are closed while the shutters J² are open, so that the vane I holds the wind wheel D in the wind. Now in case a heavy gust of wind strikes the wind wheel, it acts on the storm vane P, so that the shutters I³ and J² are shifted, as above explained, to turn the wind wheel out of the wind. In a like manner when the wind wheel D exceeds its normal rate of speed, the regulating cam R is actuated by the centrifugal action of the weight S′, to cause a shifting of the shutters to turn the wind wheel out of the wind, and in a like manner excess of power in the wind wheel D causes the fly wheel H to uncouple the shafts G and H′, to allow the wind wheel D to rotate freely without the load, so that the regulating device becomes active and turns the wind wheel out of the wind. As previously explained, the operator standing on the ground and manipulating the rope O can throw the wind wheel at any time in or out of the wind.

The wind wheel D has each blade D⁴ inclined to the axis of the wheel (see Fig. 12), and secured to a pair of front and rear radial spokes D′ diverging or set in different axial planes, so that the surface of the blade D⁴ increases in an outward direction, and at the same time the angle of the blade D⁴ changes relative to the axis of the wheel. By this arrangement the power of the wind on the blades D⁴ is utilized to the fullest advantage.

For small motors it is desirable to connect the wind wheel D by the use of gear wheels E², E³ (see Fig. 14) with a crank shaft E⁴ journaled on the head B and connected with a pitman F³ for transmitting the motion directly to other machinery without the use of the shafts G and H′ and fly wheel H.

Having thus described my invention, I claim as new and desire to secure by Letters Patent:

1. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, and means for increasing or decreasing the effective areas of the vanes.

2. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, the said vanes being slatted and provided with shutters for opening and closing the spaces between the slats, and means for operating the said shutters.

3. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, and manually controlled means for increasing and decreasing the effective areas of the said vanes.

4. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, and storm-controlled means for increasing the effective area of one of the vanes and decreasing the effective area of the other vane to throw the wind wheel out of the wind.

5. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, and means controlled by the said wind wheel for increasing or decreasing the effective areas of the said vanes.

6. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, the said vanes being slatted and provided with shutters for opening and closing the spaces between the slats, and manually-controlled means for actuating the said shutters to throw the said wind wheel in or out of the wind.

7. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, the said vanes being slatted and provided with shutters for opening and closing the spaces between the slats, and storm controlled means for actuating the said shutters to throw the said wind wheel out of the wind.

8. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, the said vanes being slatted and provided with shutters for opening and closing the spaces between the slats, and means controlled by the said wind wheel for actuating the shutters to throw the wind wheel more or less out of the wind.

9. A wind motor comprising a wind wheel, a revoluble head on which the said wind wheel is mounted to rotate loosely, a plurality of vanes mounted on the said head for turning the latter, one of the vanes being arranged parallel to the axis of the wind wheel and the other vane standing transversely to the axis of the wind wheel, the said vanes being slatted and provided with shutters for opening and closing the spaces between the slats, means for connecting the said shutters with each other to move one into an open position while moving the other into a closed position and vice versa, and means for actuating the said shutters.

10. A wind motor comprising a wind wheel, a revoluble head on which the wind wheel is journaled, a plurality of vanes supported on the said head for turning the latter, one of the vanes being arranged parallel to the axis of the wind wheel and the other vane standing at right angles to the axis of the wind wheel, each of the vanes having spaces, shutters for opening and closing the said spaces and provided with rack bars, a gear wheel mounted to turn on the said head and engaged by the said rack bars, and means for imparting motion to the rack bars to shift the rack bars simultaneously and to move the shutter on one vane into an open position and to move the shutter on the other vane correspondingly into a closed position.

11. A wind motor comprising a wind wheel, a revoluble head on which the wind wheel is journaled, a plurality of vanes supported on the said head for turning the latter, one of the vanes being arranged parallel to the axis of the wind wheel and the other vane standing at right angles to the axis of the wind wheel, each of the vanes having spaces, shutters for opening and closing the said spaces and provided with rack bars, a gear wheel mounted to turn on the said head and engaged by the said rack bars, a pivoted storm vane, and means connecting the said storm vane with one of the said rack bars to shift both rack bars simultaneously and to move the shutter on one vane into an open position and to move the shutter on the other vane correspondingly into a closed position.

12. A wind motor comprising a wind wheel, a revoluble head on which the wind wheel is journaled, a plurality of vanes supported on the said head for turning the latter, one of the vanes being arranged parallel to the axis of the wind wheel and the other vane standing at right angles to the axis of the wind wheel, each of the vanes having spaces, shutters for opening and closing the said spaces provided with rack bars, a gear wheel mounted to turn on the said head and engaged by the said rack bars, a pivoted storm vane, and means connecting the said storm vane with one of the said rack bars to shift both rack bars simultaneously and to move the shutter on one vane into an open position and to move the shutter on the other vane correspondingly into a closed position, the said means comprising a shaft engaged by the storm vane and a gear wheel on the said shaft and engaging gear teeth on one of the said rack bars.

13. A wind motor comprising a wind wheel, a revoluble head on which the wind wheel is journaled, a plurality of vanes supported on the said head for turning the latter, one of the vanes being arranged parallel to the axis of the wind wheel and the other vane standing at right angles to the axis of the wind wheel, each of the vanes having spaces, shutters for opening and closing the said spaces and provided with rack bars, a gear wheel mounted to turn on the said head and engaged by the said rack bars, a manually controlled weighted lever, an operating lever adapted to be actuated by the said weighted lever, and a pawl on the said operating lever and adapted to engage gear teeth on one of the said rack bars.

14. A wind motor comprising a wind wheel, a revoluble head on which the wind wheel is journaled, a plurality of vanes supported on the said head for turning the latter, one of the vanes being arranged parallel to the axis of the wind wheel and the other vane standing at right angles to the axis of the wind wheel, each of the vanes having spaces, shutters for opening and closing the said spaces and provided with rack bars, a gear wheel mounted to turn on the said head and engaged by the said rack bars, an operating lever, a pawl on the said operating lever and adapted to engage gear teeth on one of the said rack bars, a cam for actuating the said operating lever and mounted to slide on the said wind wheel, and centrifugal means on the said wind wheel and connected with the said cam to actuate the latter.

In testimony whereof I have signed my name to this specification in the presence of two subscribing witnesses.

ROBERTO FRITZ EMIL OKRASSA.

Witnesses:
   THEO. G. HOSTER,
   EVERARD B. MARSHALL.